May 3, 1932.   W. F. SCHEPPY   1,856,887
MEAT BLOCK CLEANER
Filed Feb. 14, 1931
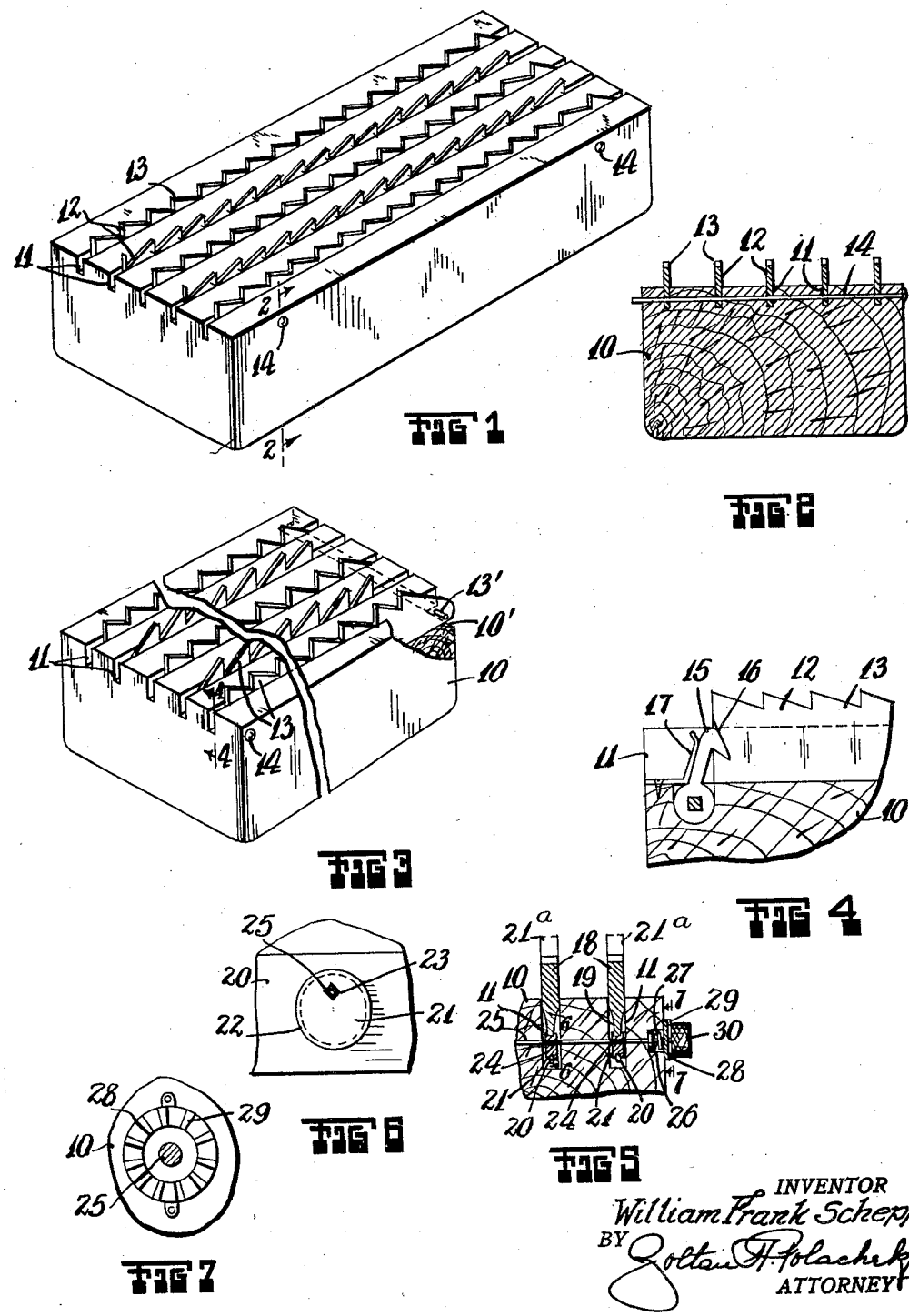
INVENTOR
William Frank Scheppy
BY
Zoltan H. Polachek
ATTORNEY Patented May 3, 1932

1,856,887

UNITED STATES PATENT OFFICE

WILLIAM FRANK SCHEPPY, OF ELMHURST, NEW YORK

MEAT BLOCK CLEANER

Application filed February 14, 1931. Serial No. 515,768.

This invention relates to new and useful improvements in a meat block cleaner.

The invention has for an object the provision of a meat block cleaner which is characterized by a block formed with parallel grooves extending from end to end, hacks or blades in said grooves, and means for removably holding the hacks or blades in place.

Another one of the objects of this invention is to construct the cleaner with two or more blades in that two or more straight lines determine a plane surface, so that the cleaner may be engaged over the top of a meat table without wobbling.

It is a still further object of this invention to provide two or more nails engaging through the block from side to side and through the basis of the blades for constituting the means of removably holding the blades in place.

A still further object of this invention is to arrange alternate blades with their teeth directed in opposite directions so as to provide greater efficiency in the cleaning operation of the cleaner.

The invention furthermore provides other means for removably holding the blades in place and contemplates particularly the provision of hooks.

A still further object of this invention is to provide a means for changing the resiliency of the blades so as to suit the taste of the user or the characteristics of the table top.

A still further object of this invention is to construct a meat block cleaner which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a meat block cleaner constructed according to this invention.

Fig. 2 is a transverse sectional view taken on the line 2—2 of Fig. 1.

Fig. 3 is a fragmentary perspective view similar to Fig. 1, but illustrating a modified form of the device.

Fig. 4 is an enlarged fragmentary sectional view taken on the line 4—4 of Fig. 3.

Fig. 5 is an enlarged fragmentary detailed view similar to a portion of Fig. 2, but illustrating another modified form of the invention.

Fig. 6 is a fragmentary sectional view taken on the line 6—6 of Fig. 5.

Fig. 7 is a fragmentary sectional view taken on the line 7—7 of Fig. 5.

In Figs. 1 and 2 a meat block cleaner has been illustrated and comprises a rectangular block 10 preferably made from wood with rounded corners and formed with a plurality of top parallel grooves 11 extending from end to end. A hack saw blade 12 is engaged in each one of the grooves so as to also extend from end to end of the block. The teeth 13 of adjacent hack saw blades are directed in opposite directions, while alternate hack saw blades have their teeth directed in the same direction for efficiency in the operation of the cleaner. When the cleaner is moved in one direction, certain of the hack saw teeth will idle over the table in that they are moved rearwards and therefore this time the other hack saws will operate to scrape the top of the table. When moved in the other direction, the opposite will be true.

A means is also provided for removably holding the blades 12 in place upon the block 10. This means is in the form of nails 14 extended completely through the block from side to side. These nails extend through apertures in portions of the blade within the grooves 11 to accomplish the holding. As shown in Fig. 2, the nails have a head at one end and at the other end slightly project so that they may be easily removed. While two nails are illustrated in Fig. 1 to accomplish the holding of the blades, this is not intended as a limitation since any number may be used. Furthermore, while a plurality of blades have been illustrated, upon the block 10, the block may just as well be manufactured of a smaller width and only two blades used.

In Figs. 3 and 4 a modified form of the device has been illustrated, in which particularly a modified means has been shown for removably holding the hack saw blades 12 in place. One end of each hack saw blade is provided with a short pin 13' extending through the blade at both sides and adapted to engage a V shaped groove 10' in the block 10. A nail 14 is extended through the block from side to side past the other ends of the hack saw blades. Hooks 15 are fixed upon the nail 14, one in each of the grooves 11 and are engageable within niches 16 formed in the ends of the blades. Springs 17 are attached within the grooves 11 and normally act against the outer sides of the hooks 15 for urging the hooks into engagement with the notches 16. The blades 13 may be removed when desired by merely turning the head 14, so that all of the hooks 15 simultaneously disengage from the notches 16.

In Figs. 5 to 7 inclusive, another form of the device has been illustrated, in which a means is provided for changing the resiliency of the blades. This means makes use of hack saw blades 18 which have top portions with flat parallel sides extending slightly within the grooves 11 to points indicated by the reference numerals 19. Below these points the sides of the blades taper towards each other and then continue in reduced portions 20. A means is provided for holding the blades 18 in various elevated positions, as for example indicated by the dot and dash lines 21ª, thereby different portions of the tapered sides 19 may engage against the corners of the grooves 11 so as to allow flexing of the blades to different degrees laterally.

The means for raising and lowering the blades 18 comprises discs 21 rotatively mounted through the lower reduced portions 20 of the blades. These discs have flanges 22 arranged on opposite sides of the sides of the reduced portion 20 to accomplish the rotative mounting. Square openings 23 are formed in each of the discs eccentrically thereof and receive square portions 24 of a shaft 25 extended through the block. One end of the shaft 25 is provided with a flange 26 urged in one direction by an expansion spring 27 acting against a plate 28 attached upon the outer side of the block. The plate 28 is formed with a plurality of radial teeth 29 interengageable with coactable teeth upon a head 30 on the outer end of the shaft 24.

To change the extended positions of the blades 18, the head 30 may be drawn outwards so as to disengage the radial teeth 29 from each other whereupon the head may be turned so as to cause the various discs 21 to turn correspondingly. Since the shaft 25 extends eccentrically to the discs, the blades will be moved inwards or outwards depending upon the faces in which the discs 21 are in.

The meat block cleaner may be used in a conventional manner as customary wire scrubbing brushes, that is, the block may be manually held so that the teeth of the various hack saws act upon the top of the table and then the block may be moved through desired motions to cause the teeth to scrape and clean the top of the butcher table. In the event that any of the hack saw blades break, they may be readily removed and replaced by new ones.

It is to be understood that any number of saw blades may be used in the block 10 and that the said saw blades may be of any desired lengths. The block 10 may also be provided with suitable handles if so desired.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A meat block cleaner, comprising a block with parallel grooves extending from end to end, hack saw blades within said grooves and extending above the block so that the teeth are located at the top, and means for changing the resilient action of said blades, comprising tapered portions on the sides of said blades at locations wherein normally the flat sides of the blades act against the sides of the grooves and only upon raising of the blades do the tapered portions extend above the top of the block.

2. A meat block cleaner, comprising a block with parallel grooves extending from end to end, hack saw blades within said grooves and extending above the block so that the teeth are located at the top, and means for changing the resilient action of said blades, comprising tapered portions on the sides of said blades at locations wherein normally the flat sides of the blades act against the sides of the grooves and only upon raising of the blades do the tapered portions extend above the top of the block, and means for raising and lowering said blades.

3. A meat block cleaner, comprising a block with parallel grooves extending from end to end, hack saw blades within said grooves and extending above the block so that the teeth are located at the top, and means for changing the resilient action of said blades, comprising tapered portions on the sides of said blades at locations wherein normally the flat sides of the blades act against the sides of the grooves and only upon raising of the blades do the tapered portions extend above the top of the block, and means for raising and lowering said blades, comprising discs rotatively mounted within said blades, a shaft eccentrically mounted through said discs and rotatively mounted in said block, said shaft having square portions at the points engaging through the discs, and means for holding said shafts in various rotative positions.

4. A meat block cleaner, comprising a block with parallel grooves extending from end to end, hack saw blades within said grooves and extending above the block so that the teeth are located at the top, and means for changing the resilient action of said blades, comprising tapered portions on the sides of said blades at locations wherein normally the flat sides of the blades act against the sides of the grooves and only upon raising of the blades do the tapered portions extend above the top of the block, and means for raising and lowering said blades, comprising discs rotatively mounted within said blades, a shaft eccentrically mounted through said discs and rotatively mounted in said block, said shaft having square portions at the points engaging through the discs, and means for holding said shafts in various rotative positions, including heads upon the extended ends of said shafts and having radial teeth engageable with complementary teeth fixed upon a member attached upon the side of said block.

In testimony whereof I have affixed my signature.

WILLIAM FRANK SCHEPPY.